(12) United States Patent
Myron et al.

(10) Patent No.: US 7,896,206 B2
(45) Date of Patent: Mar. 1, 2011

(54) STORAGE DEVICE FOR A VEHICLE ROOF TOP CARGO CARRIER AND CORRESPONDING METHODS

(76) Inventors: Jeffrey Myron, Cocoa Beach, FL (US); Elizabeth Myron, Cocoa Beach, FL (US)

( * ) Notice: Subject to any disclaimer, the term of this patent is extended or adjusted under 35 U.S.C. 154(b) by 1348 days.

(21) Appl. No.: 11/359,298

(22) Filed: Feb. 22, 2006

(65) Prior Publication Data

US 2006/0186154 A1    Aug. 24, 2006

Related U.S. Application Data

(60) Provisional application No. 60/655,528, filed on Feb. 23, 2005.

(51) Int. Cl.
| | |
|---|---|
| B60R 7/00 | (2006.01) |
| B60R 9/00 | (2006.01) |
| B60R 9/048 | (2006.01) |
| A47F 7/00 | (2006.01) |
| A47F 7/06 | (2006.01) |

(52) U.S. Cl. ............... 224/311; 224/282; 224/321; 224/319; 224/324; 211/17; 211/31

(58) Field of Classification Search ............... 224/311, 224/282, 321, 319, 324; 211/110, 31, 17
See application file for complete search history.

(56) References Cited

U.S. PATENT DOCUMENTS

| | | | |
|---|---|---|---|
| 136,905 A | 3/1873 | Danner | |
| 478,025 A | 6/1892 | Schraudner | |
| 595,967 A | 12/1897 | Parsons | |
| 643,818 A | 2/1900 | Headland | |
| 1,819,516 A * | 8/1931 | Kelly | 296/37.7 |
| 2,253,423 A * | 8/1941 | Fellers et al. | 224/311 |
| 2,971,657 A * | 2/1961 | Zadek | 108/147.17 |
| 3,261,521 A * | 7/1966 | Meccico et al. | 224/553 |
| 3,347,187 A * | 10/1967 | Khoury | 108/152 |
| 3,872,972 A | 3/1975 | Cummins et al. | 211/17 |
| 4,699,437 A * | 10/1987 | Genereaux | 312/248 |
| 4,714,166 A | 12/1987 | Hann et al. | 211/113 |
| 5,044,505 A | 9/1991 | Spratt | 211/22 |
| 5,460,274 A | 10/1995 | Kramer | 211/17 |
| 5,848,708 A | 12/1998 | Edwards | 211/17 |
| 6,269,958 B1 | 8/2001 | Pollock et al. | 211/18 |
| 2004/0226899 A1 | 11/2004 | Ferron | 211/17 |

* cited by examiner

*Primary Examiner*—Nathan J Newhouse
*Assistant Examiner*—Lester L Vanterpool
(74) *Attorney, Agent, or Firm*—Allen, Dyer, Doppelt, Milbrath & Gilchrist, P.A.

(57) ABSTRACT

A storage device for a vehicle roof top cargo carrier includes a frame, and a rod assembly is carried by the frame. A pair of spaced apart attachment points is carried by the frame. A forward hanger is to be secured to the cargo carrier and includes a hooked end and an attachment end. A rear hanger is to be secured to the cargo carrier and includes a hooked end and an attachment end. The forward and rear hangers are to be hooked onto the rod assembly using the hooked ends, and the attachment ends are to be held in place by the pair of attachment points.

19 Claims, 7 Drawing Sheets

STORAGE DEVICE FOR A VEHICLE ROOF TOP CARGO CARRIER AND CORRESPONDING METHODS

RELATED APPLICATION

This application claims the benefit of U.S. Provisional Application Ser. No. 60/655,528 filed Feb. 23, 2005, the entire contents of which are incorporated herein by reference.

FIELD OF THE INVENTION

The present invention relates to storage devices, and in particular, to a storage device for storing a vehicle roof top cargo carrier when not in use on a vehicle.

BACKGROUND OF THE INVENTION

A roof top cargo carrier provides extra luggage space for a vehicle, and is normally secured to the vehicle's luggage rack via roof top attachment hardware. Since a roof top cargo carrier is rather large and bulky, it can be difficult to store when removed from the vehicle, particularly if space is limited in a storage area.

One approach for storing a vehicle roof top cargo carrier is a hoist-based system provided by Thule. The hoist-based system is operated with a number of pulleys for lifting the cargo carrier off the ground so that it is stored adjacent the ceiling in the storage area. Each pulley is separately mounted to the ceiling, and a rope extends down from each pulley to loop under the cargo carrier. A common cross member providing tension and control for the rope is also mounted to the ceiling.

While effective, the hoist-based storage device by Thule requires a considerable amount of effort to properly align and mount the pulleys to the ceiling of the storage area. Moreover, operation of the hoist-based storage device can be rather cumbersome due to the lengthy amount of rope used to hoist the cargo carrier from the ground to the ceiling. Additionally, the hoist-based storage device places the roof top attachment hardware for the cargo carrier at head level when the cargo carrier is raised to the ceiling, which is potentially dangerous for someone walking underneath.

SUMMARY OF THE INVENTION

In view of the foregoing background, an object of the present invention is to provide a storage device for a roof top cargo carrier that is relatively straightforward to install and operate.

This and other objects, advantages and features in accordance with the present invention are provided by a storage device for a cargo carrier comprising a forward pair of roof top attachments and a rear pair of roof top attachments used for securing the cargo carrier to a roof top of a vehicle. The storage device may comprise a frame comprising forward and rear cross members connected together by first and second side members. A rod assembly may be carried by the frame and extends lengthwise along the first side member.

A pair of spaced apart attachment points may be carried by the frame and extends lengthwise along the second side member. A forward hanger is to be secured to the cargo carrier via the forward pair of roof top attachments, and may comprise a hooked end and an attachment end. Likewise, a rear hanger is to be secured to the cargo carrier via the rear pair of roof top attachments, and may comprise a hooked end and an attachment end. The forward and rear hangers are to be hooked onto the rod assembly using the hooked ends, and the attachment ends are to be held in place by the pair of attachment points.

The frame is easily mounted to the ceiling of a storage area. In addition, the forward and rear hangers are easily secured to the cargo carrier while the cargo carrier is on the ground. To store the cargo carrier, the user simply lifts the cargo carrier so that the hooked ends of the forward and rear hangers are hooked onto the rod assembly. In this position, the storage device is in an unhinged position.

To place the storage device in a hinged position for storing the cargo carrier, the hanging side of the cargo carrier is lifted so that the attachment ends of the forward and rear hangers are level with the attachment points. Next, the cargo carrier is pushed up and forward so that the hooked ends of the forward and rear hangers are moved forward. This causes the attachment ends to rest on the attachment points.

The rod assembly may comprise a rod, and a plurality of rod attachments connected to the frame for holding the rod outwardly therefrom. The rod attachments may be connected to the first side member. An outwardly extending end of each rod attachment may include an opening extending therethrough for receiving the rod.

The pair of attachment points may be connected to the second side member. The attachment points may comprise hooks, which may be L-shaped or U-shaped, for example. The L-shaped hooks may further include stop points for preventing the attachment ends of the forward and rear hangers from accidentally being slid off of the attachment points.

Another embodiment of the storage device comprises a frame comprising forward and rear cross members connected together by a pair of side members. A forward pair of attachment points may be carried by the frame adjacent the forward cross member, and a rear pair of attachment points may be carried by the frame adjacent the rear cross member.

The storage device further comprises a forward hanger to be secured to the cargo carrier via the forward pair of roof top attachments, and a rear hanger to be secured to the cargo carrier via the rear pair of roof top attachments. The forward and rear hangers are to be held by the forward and rear pairs of attachment points.

In this embodiment, the frame is also easily mounted to the ceiling of the storage area. To store the cargo carrier, the user lifts the cargo carrier so that the forward and rear hangers are held in place by the forward and rear pairs of attachment points.

The forward pair of attachment points may be carried by the side members of the frame, and likewise, the rear pair of attachment points may also be carried by the side members of the frame. The forward pair of attachment points may comprise a pair of U-shaped hooks, and the rear pair of attachment points may comprise a pair of L-shaped hooks. The frame may be rectangular shaped, and is to be mounted to a ceiling or wall of the storage area.

Other aspects of the present invention are directed to methods for storing a cargo carrier in a storage area using the respective storage devices as defined above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring now to FIGS. 1-5, a storage device 10 for a vehicle roof top cargo carrier 20 will be discussed. The cargo carrier 20 comprises a forward pair of rooftop attachments 22 and a rear pair of rooftop attachments 24 used for securing the cargo carrier to a roof top of a vehicle. The cargo carrier is typically secured to a luggage rack on the roof top of the vehicle. If a vehicle does not have a luggage rack, railing mounts may be installed on the vehicle, as readily understood by those skilled in the art.

The storage device 10 comprises a frame 30 that is to be mounted to a ceiling of a storage area, such as a garage, for example. The frame 30 comprises forward and rear cross members 32, 34 connected together by first and second side members 36, 38. The frame 30 may be mounted to the ceiling using anchor bolts or wood screws, for example, as represented by reference 31.

A rod assembly 40 is carried by the frame 30 and extends lengthwise along the first side member 36. Spaced apart attachment points 50 are carried by the frame 30 and extend lengthwise along the second side member 38.

The storage device 10 further includes forward and rear hangers 60, 70 to be secured to the cargo carrier 20. The forward hanger 60 is secured to the cargo carrier 20 via the forward pair of roof top attachments 22, and comprises a hooked end 62 and an attachment end 64. The rear hanger 70 is secured to the cargo carrier 20 via the rear pair of roof top attachments 24, and also comprises a hooked end 72 and an attachment end 74.

Figure 1:
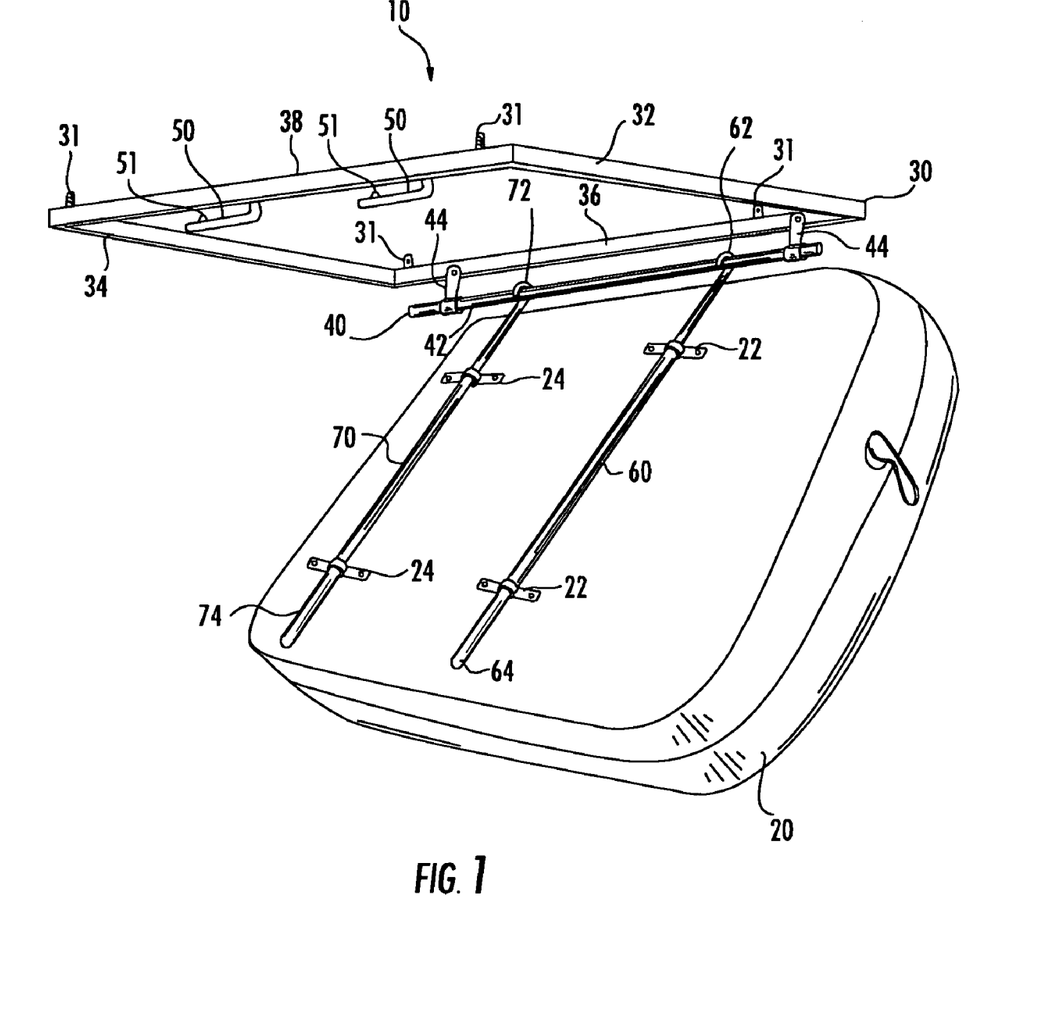
FIG. 1 is a perspective view of the storage device mounted to the ceiling and in an unhinged position with a cargo carrier attached thereto in accordance with the present invention.

After the forward and rear hangers 60, 70 have been secured to the cargo carrier 20, the cargo carrier is lifted so that the hooked ends 62, 72 of the forward and rear hangers are hooked onto the rod assembly 40. In this position, the storage device 10 is in an unhinged position, as shown in FIG. 1.

Figure 2:
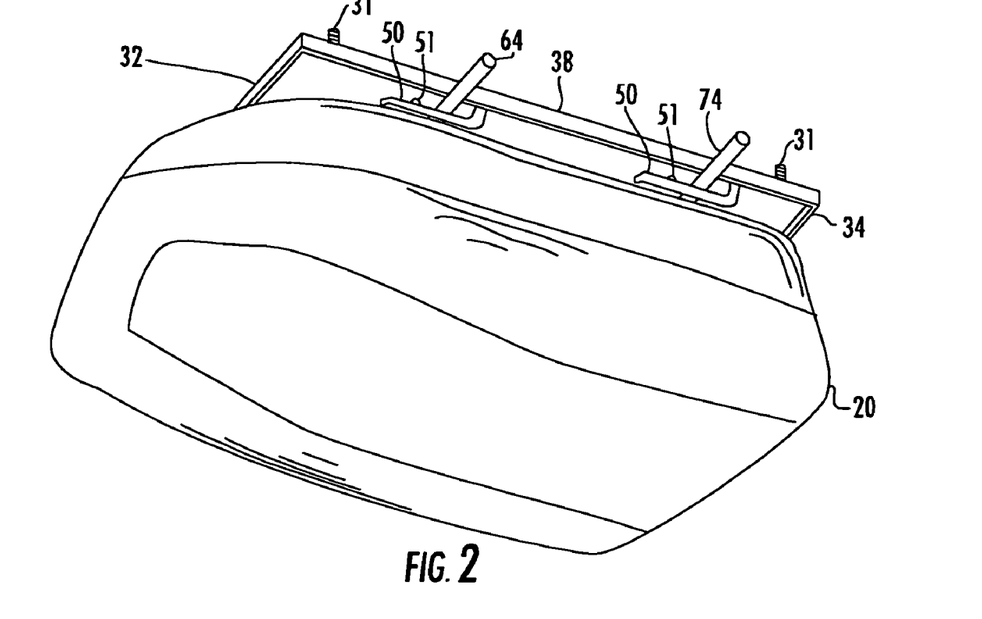
FIGS. 2 and 3 are side perspective views of the storage device in a hinged position with the cargo carrier attached thereto in accordance with the present invention.
Figure 3:
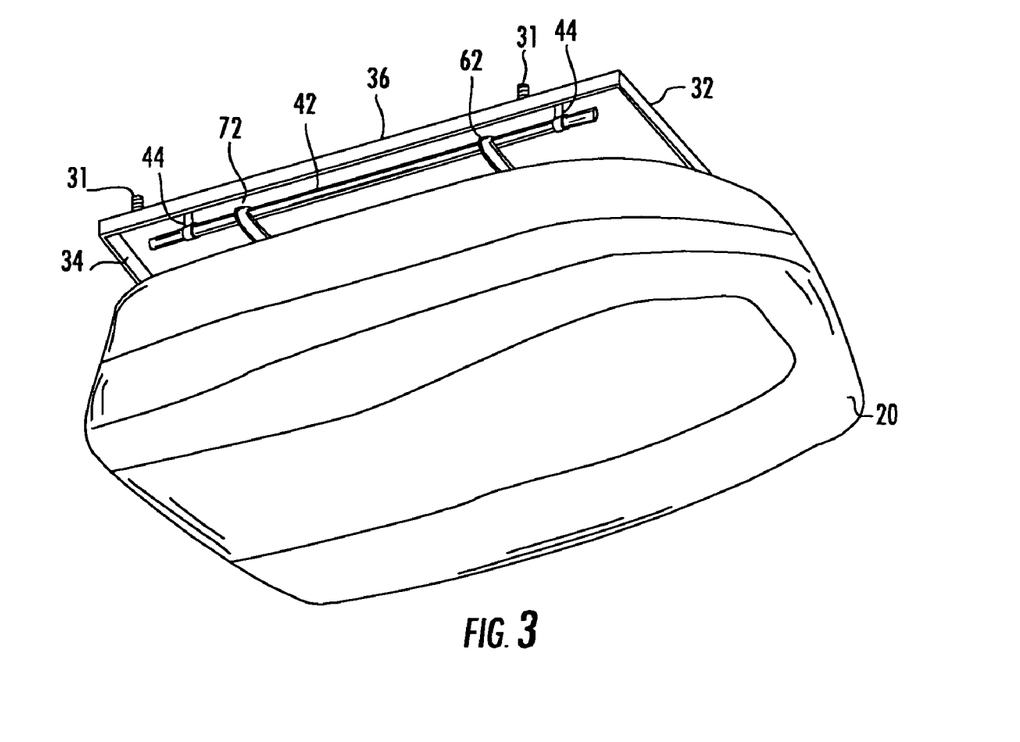
Figure 4:
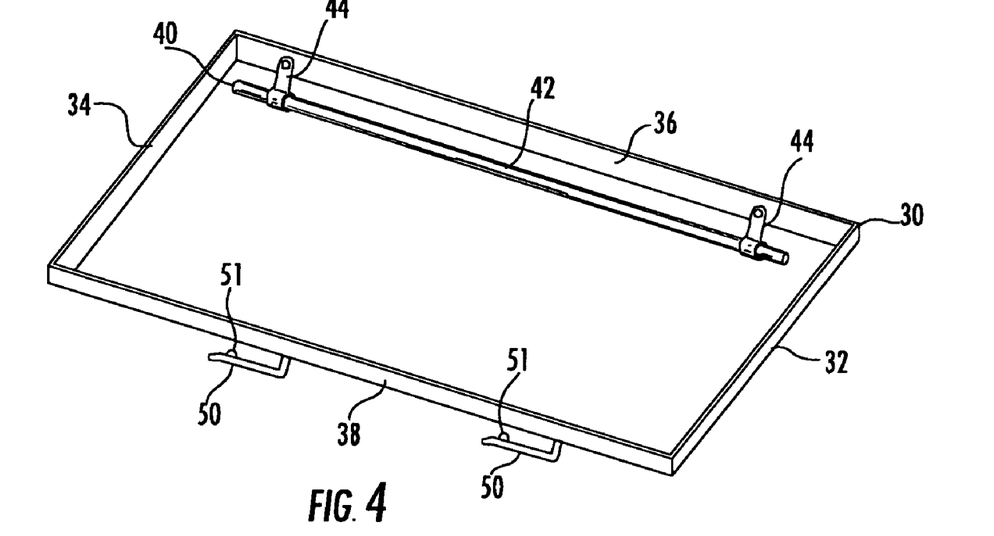
FIG. 4 is a perspective view of the frame shown in FIG. 1 without the cargo carrier attached thereto.

To place the storage device 10 in a hinged position for storing the cargo carrier 20, the hanging side of the cargo carrier is lifted so that the attachment ends 64, 74 of the forward and rear hangers 60, 70 are level with the attachment points 50. Next, the cargo carrier 20 is pushed up and forward so that the hooked ends 62, 72 of the forward and rear hangers 60, 70 are moved forward. This causes the attachment ends 64, 74 to rest on the attachment points 50, as shown in FIGS. 2 and 3.

The attachment points 50 include stop points 51. Before the attachment ends 64, 74 can securely rest on the attachment points 50, they need to move over the stop points 51. The stop points 51 prevent the attachment ends 64, 74 from accidentally being slid off of the attachment points 50.

If the hooked ends 62, 72 of the forward and rear hangers 60, 70 are initially hooked onto the rod assembly 40 too far forward, then the attachment ends 64, 74 would hit the underside of the attachment points 50. In this case, the user simply pulls the cargo carrier 20 toward the rear of the frame 30 so that the hooked ends 62, 72 of the forward and rear hangers 60, 70 are moved backwards. This allows the user to lift the cargo carrier 20 so that the attachment ends 64, 74 are level with the attachment points 50. As above, the user then simply pushes the cargo carrier 20 so that the attachment ends 64, 74 rest on the attachment points 50.

To unhinge the storage device 10, the user moves the cargo carrier 20 toward the rear of the frame 30 until the attachment ends 64, 74 of the forward and rear hangers 60, 70 are moved past the stop points 51 and are no longer held by the attachment points 50. To remove the cargo carrier 20 from the storage device, the user unhooks the hooked ends 62, 72 of the forward and rear hangers 60, 70 from the rod assembly 40.

The rod assembly 40 will now be discussed in greater detail. The rod assembly 40 comprises a rod 42 and a plurality of rod attachments 44 connected to the frame 30 for holding the rod outwardly therefrom. The rod 42 is held away from the frame 30 to allow clearance for the cargo carrier 20 to move between the unhinged and hinged positions.

The illustrated rod attachments 44 are connected to the first side member 36. The actual number of rod attachments 44 depends on the amount of support required for the rod 42. Although not shown in the figures, in addition to or in lieu of connecting the rod attachments 44 to the first side member 36, rod attachments 44 may be connected to the front and rear cross members 32, 34 for holding the rod 42.

Figure 6:
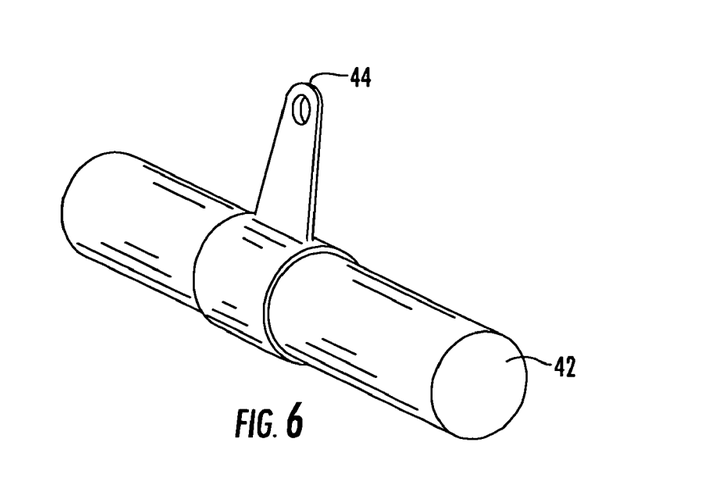
FIG. 6 is a perspective side view of a rod attachment attached to a rod in accordance with the present invention.

One end of each rod attachment 44 is attached to the first side member 36 with one or more bolts, for example. Other fastening devices are acceptable for securing each rod attachment 44 to the frame 30, such as pins or clips, for example. The outwardly extending end of each rod attachment 44 includes an opening extending therethrough for receiving the rod 42, as shown in FIG. 6. In other words, the rod 42 is slid through the openings in the rod attachments 44 for holding the rod in place. Alternatively, the rod attachments 44 may attach to or clamp onto the rod 40 for holding the rod in place.

With respect to the attachment points 50, each attachment point is connected to the second side member 38 of the frame 30. This connection may be provided by one or more bolts 80. Other fastening devices are acceptable for securing each attachment point 50 to the frame 30, such as pins or clips, for example. In addition, positioning of the attachment points 50 on the frame 30 may be adjustable.

Figure 7:
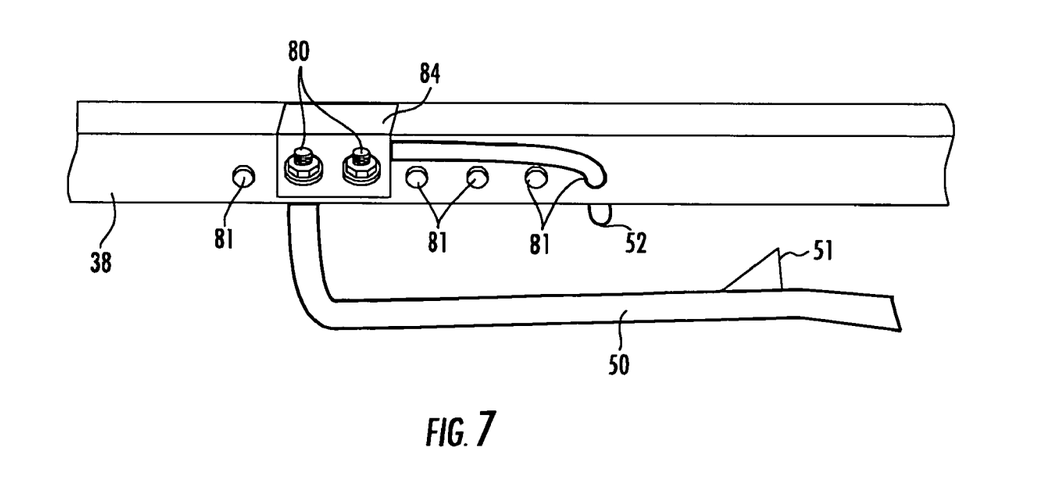
FIG. 7 is an inside perspective side view of an attachment point coupled to the frame in accordance with the present invention.
Figure 8:
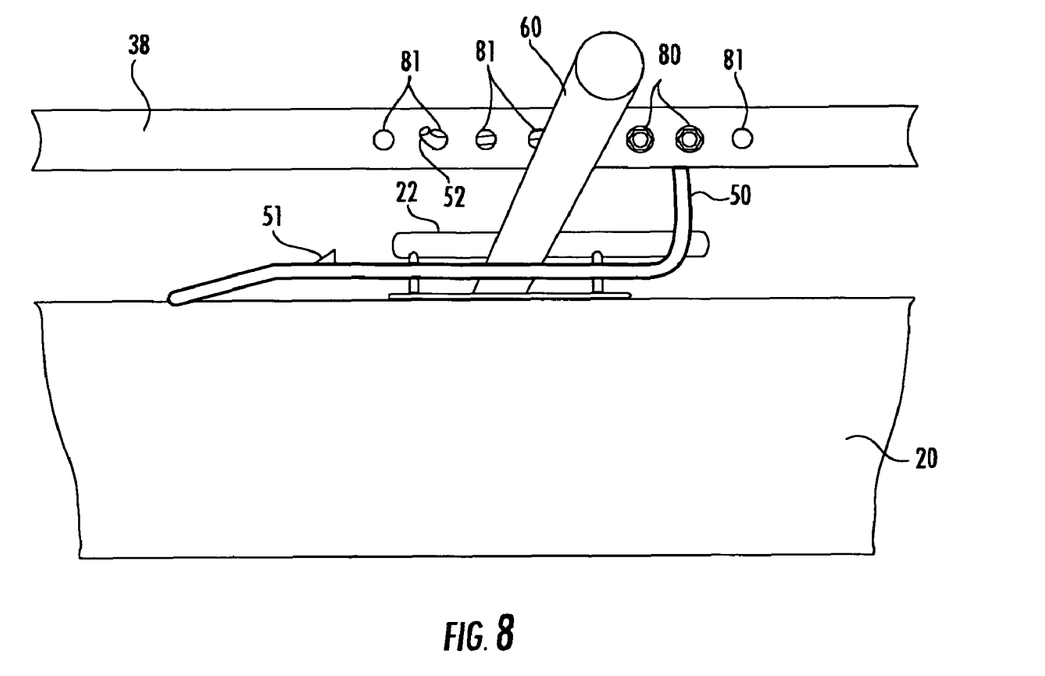
FIG. 8 is an outside perspective side view of an attachment point coupled to the frame with the rear hanger positioned thereon in accordance with the present invention.

In one embodiment, the adjustment is possible due to a series of holes 81 in the second side member 38, which is only illustrated in FIGS. 7 and 8. One end 52 of the attachment point is inserted through a desired hole 81, and a midsection of the attachment point 50 is held next to the second side member 38 via a plate 84 and a pair of bolts 80. Adjustment of the attachment points 50 is not limited to this particular embodiment.

Each attachment point 50 comprises a hook. The hook 50 may be L-shaped, as illustrated. Alternatively, the hook may be U-shape, for example. The exposed end of the hook 50 is preferably angled away from the frame 30 to assist in directing the attachment ends 64, 74 of the forward and rear hangers 60, 70 onto the attachment points 50 when placing the storage device 10 in the hinged position for storing the cargo carrier 20. The attachment points 50 are not limited to hooks, and may include latches or other types of holding devices, as readily appreciated by those skilled in the art.

To prevent the storage device 10 from inadvertently being unhinged, the L-shaped hooks 50 include stop points 51. The stop points 51 require the attachment ends 64, 74 of the forward and rear hangers 60, 70 to be lifted up and over the stop points 51 before the storage device 10 can be placed in the unhinged position. There could exist an additional locking device to prevent the attachment ends 64 and 74 from moving forward. One such mechanism is a straightforward latch that hinges down from the second side member 38 to the attachment point 50. Another such mechanism is a flexible strap that attaches to the second side member 38 and hooks to the end of the attachment point 50.

Figure 5:
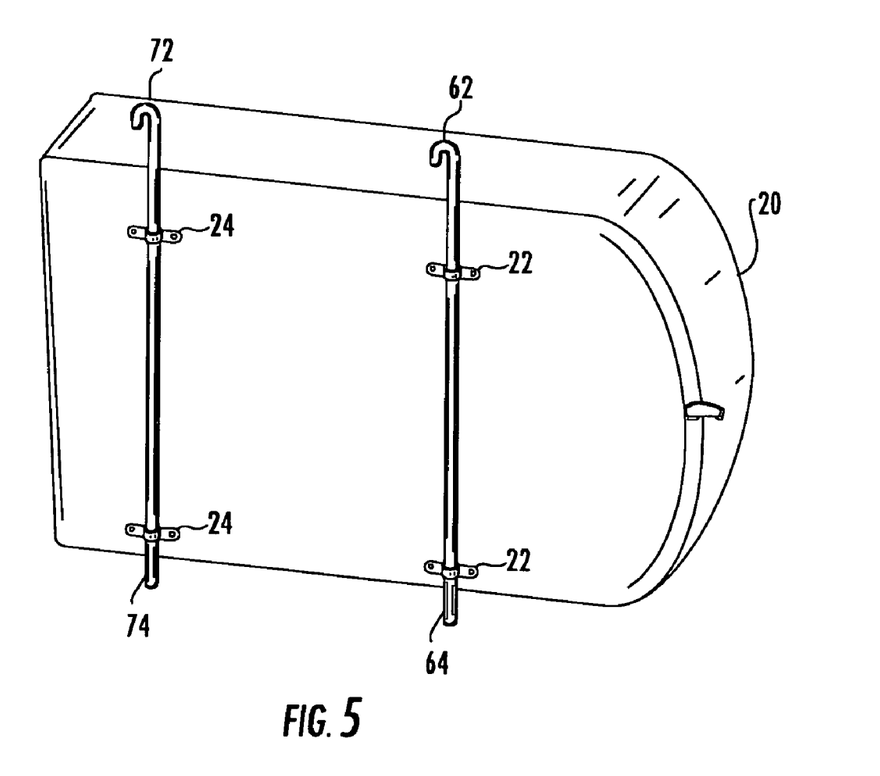
FIG. 5 is a perspective view of the cargo carrier shown in FIG. 1 detached from the frame.

The forward and rear hangers 60, 70 preferably extend the width of the cargo carrier 20, as best shown in FIG. 5. More particularly, the hooked ends 62, 72 of the forward and rear hangers 60, 70 extend beyond the outer edge of the cargo carrier 20 to allow the user enough room or space to hook the hooked ends 62, 72 to the rod 40. Moreover, this room or space also allows the cargo carrier 20 to be moved from the unhinged to the hinged position or vice-versa without swinging into the ceiling. The attachment ends 64, 74 of the forward and rear hangers 60, 70 need to extend beyond the respective forward and rear roof top attachments 22, 24.

In the illustrated embodiment, the hooked ends 62, 72 of the forward and rear hangers 60, 70 are hooked under the rod 40. Instead of being hooked under the bar 40, the hooked ends 62, 72 may be hooked over the rod.

Figure 9:
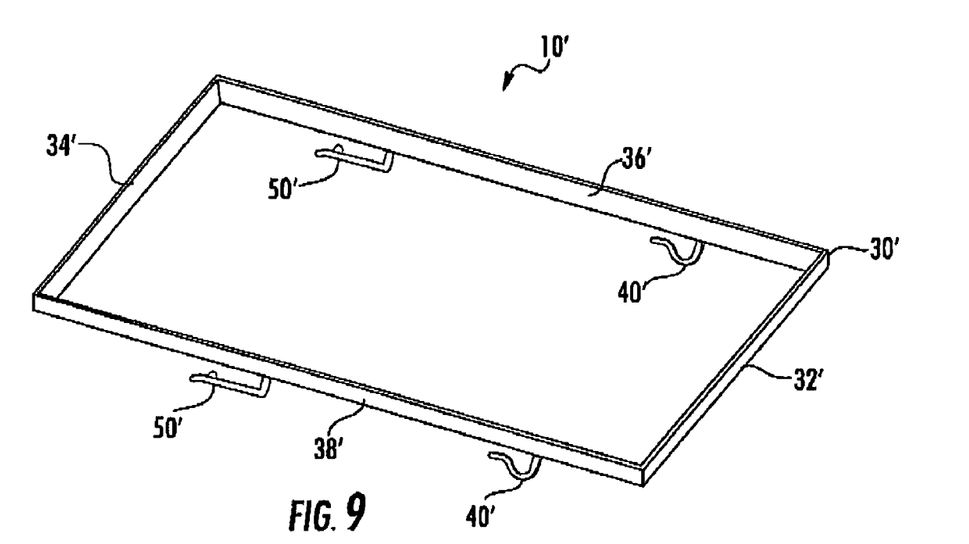
FIG. 9 is a perspective view of another embodiment of the storage device with a cargo carrier attached thereto in accordance with the present invention.
Figure 10:
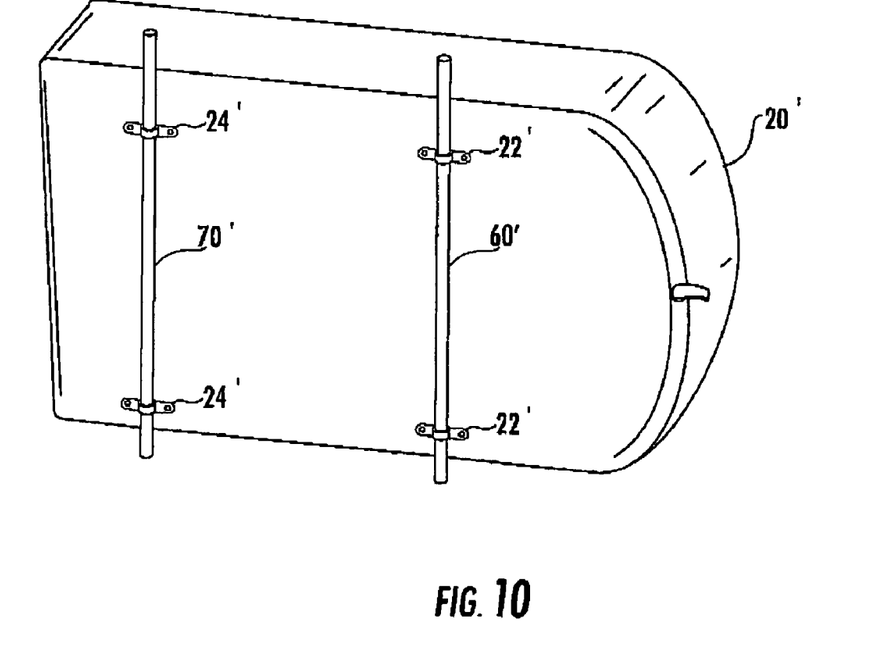
FIG. 10 is a perspective view of the frame shown in FIG. 9.
Figure 11:
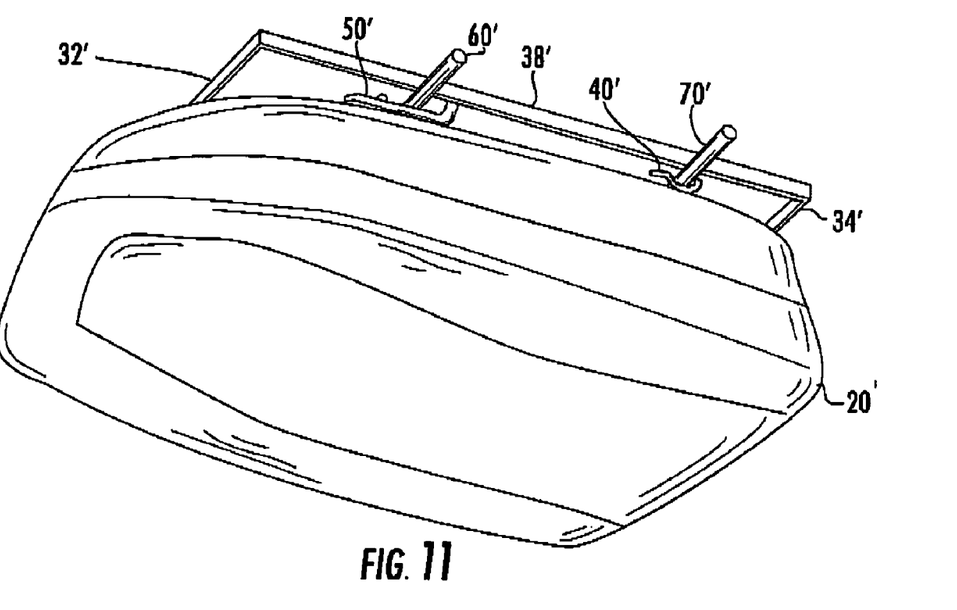
FIG. 11 is a perspective view of the cargo carrier shown in FIG. 9 detached from the frame.

Another embodiment of the storage device 10' will now be discussed in reference to FIGS. 9-11. The illustrated storage device 10' comprises a frame 30' comprising forward and rear cross members 32', 34' connected together by a pair of side members 36', 38'.

A forward pair of attachment points 40' is carried by the frame 30' adjacent the forward cross member 32'. A rear pair of attachment points 50' is carried by the frame 30' adjacent the rear cross member 34'.

As in the embodiment discussed above, forward and rear hangers 60', 70' are to be secured to the cargo carrier 20. The forward hanger 60' is secured to the cargo carrier 20' via the forward pair 22' of roof top attachments. Likewise, the rear hanger 70' is secured to the cargo carrier 20' via the rear pair 24' of roof top attachments.

To store the cargo carrier 20', the cargo carrier is lifted so that the forward and rear hangers 60', 70' are held in place by the forward and rear pairs of attachment points 40', 50'. In addition to the frame 30' being mounted on the ceiling of the storage area, the frame may be mounted on a wall.

When the frame 30' is mounted on the wall, the user does not have to lift the cargo carrier 20' to the ceiling. Instead, the user simply lifts the cargo carrier waist or shoulder level until the forward and rear hangers 60', 70' or held in place by the forward and rear pairs of attachment points 40', 50'.

The forward pair of attachment points 40' is carried by the pair of side members 32', 34', and the rear pair of attachment points 50' is also carried by the pair of side members. In the illustrated embodiment, the forward pair of attachment points 40' comprises a pair of U-shaped hooks, and the rear pair of attachment points 50' comprises a pair of L-shaped. hooks. The storage device 10' is not limited by the L-and U-shaped hooks. Other types of attachment points may be carried by the frame for holding in place the forward and rear hangers 60', 70'.

Another aspect of the present invention is directed to a method for storing a cargo carrier 20 using the storage devices 10, 10' as described above. The method for storing the first embodiment storage device 10 comprises mounting the frame 30 to a ceiling in the storage area, and securing the forward hanger 60 to the cargo carrier 20 via the forward pair of vehicle roof top attachments 22 associated with the cargo carrier. The rear hanger 70 is secured to the cargo carrier 20 via the rear pair of vehicle roof top attachments 24 associated with the cargo carrier.

The method further comprises hooking the hooked ends 62, 72 of the forward and rear hangers 60, 70 onto the rod assembly 40, and positioning the attachment ends 64, 74 of the forward and rear hangers 60, 70 adjacent the frame 30 while the hooked ends are hooked onto the rod assembly 40. The hooked ends 62, 72 of the forward and rear hangers 60, 70 are slid along the rod assembly 40 so that the cargo carrier 20 is moved toward the forward cross member 32 until the attachment ends 64, 74 of the forward and rear hangers are held in place by the pair of attachment points 50.

The method for storing the second embodiment storage device 10' comprises mounting the frame 30' to the ceiling or wall in the storage area. The forward hanger 60' is secured to the cargo carrier 20' via the forward pair of vehicle roof top attachments 22' associated with the cargo carrier, and the rear hanger 70' is secured to the cargo carrier via the rear pair of vehicle roof top attachments 24' associated with the cargo carrier. The method further comprises positioning the forward and rear hangers 60', 70' so that they are held in place by the forward and rear pairs of attachment points 40', 50'.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A storage device for a cargo carrier comprising a forward pair of roof top attachments and a rear pair of roof top attachments used for securing the cargo carrier to a roof top of a vehicle, the storage device comprising:
    a frame comprising forward and rear cross members connected together by first and second side members;
    a rod assembly carried by said frame and extending lengthwise along said first side member;
    a pair of spaced apart attachment points carried by said frame and extending lengthwise along said second side member;
    a forward hanger to be secured to the cargo carrier via the forward pair of roof top attachments, and comprising a hooked end and an attachment end;
    a rear hanger to be secured to the cargo carrier via the rear pair of roof top attachments, and comprising a hooked end and an attachment end; and
    said forward and rear hangers to be hooked onto said rod assembly using said hooked ends, and said attachment ends to be held in place by said pair of attachment points.

2. A storage device according to claim 1 wherein said rod assembly comprises:
a rod; and
a plurality of rod attachments connected to said frame for holding said rod outwardly therefrom.

3. A storage device according to claim 2 wherein said plurality of rod attachments is connected to said first side member.

4. A storage device according to claim 2 wherein an outwardly extending end of each rod attachment includes an opening extending therethrough for receiving said rod.

5. A storage device according to claim 1 wherein said pair of attachment points is connected to said second side member.

6. A storage device according to claim 1 wherein said pair of attachment points comprises a pair of hooks.

7. A storage device according to claim 6 wherein each hook is L-shaped.

8. A storage device according to claim 7 wherein each L-shaped hook comprises a stop point.

9. A storage device according to claim 6 wherein each hook is U-shaped.

10. A storage device according to claim 1 wherein said frame is rectangular shaped, and is to be mounted to a ceiling of a storage area.

11. A method for storing a cargo carrier in a storage area using a storage device comprising a frame comprising forward and rear cross members connected together by first and second side members; a rod assembly carried by the frame and extending lengthwise along the first side member; and a pair of spaced apart attachment points carried by the frame and extending lengthwise along the second side member, the method comprising:
mounting the frame to a ceiling in the storage area;
securing a forward hanger to the cargo carrier via a forward pair of vehicle roof top attachments associated with the cargo carrier, the forward hanger comprising a hooked end and an attachment end;
securing a rear hanger to the cargo carrier via a rear pair of vehicle roof top attachments associated with the cargo carrier, the rear hanger comprising a hooked end and an attachment end;
hooking the hooked ends of the forward and rear hangers onto the rod assembly; and
positioning the attachment ends of the forward and rear hangers adjacent the frame while the hooked ends are hooked onto the rod assembly; and
sliding the hooked ends of the forward and rear hangers along the rod assembly so that the cargo carrier is moved toward the forward cross member until the attachment ends of the forward and rear hangers are held in place by the pair of attachment points.

12. A method according to claim 11 wherein the rod assembly comprises a rod; and a plurality of rod attachments connected to the frame for holding the rod outwardly therefrom.

13. A method according to claim 12 wherein the plurality of rod attachments is connected to the first side member.

14. A method according to claim 12 wherein an outwardly extending end of each rod attachment includes an opening extending therethrough; and further comprising inserting the rod through the openings.

15. A method according to claim 11 wherein the pair of attachment points is connected to the second side member.

16. A method according to claim 11 wherein the pair of attachment points comprises a pair of hooks.

17. A method according to claim 16 wherein each hook is L-shaped.

18. A method according to claim 17 wherein each L-shaped hook comprises a stop point, and wherein the sliding comprises moving the attachment ends of the forward and rear hangers past the stop points.

19. A method according to claim 11 wherein the frame is rectangular shaped.

* * * * *